United States Patent Office 2,978,509
Patented Apr. 4, 1961

2,978,509

NITRATE SALTS OF ALIPHATIC POLYNITRO AMINES

Milton B. Frankel, Pasadena, Calif., assignor to Aerojet-General Corporation, Azusa, Calif., a corporation of Ohio No Drawing. Filed Oct. 22, 1956, Ser. No. 617,666

14 Claims. (Cl. 260—583)

This invention relates to new compositions of matter and a method for their preparation. In particular, this invention relates to nitrate salts of aliphatic polynitro amines having the general formula:

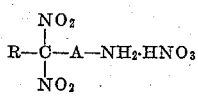

wherein R is an alkyl or nitro radical and A is an alkylene radical.

This application is a continuation-in-part of my copending United States patent application Serial No. 408,607, filed February 5, 1954, now abandoned.

Due to their high oxygen content, these compounds are particularly useful as explosives. They also find valuable use as additives in fuel components of propellants.

The compounds of this invention are readily prepared by reacting an isocyanate with dilute nitric acid in accordance with the general reaction scheme set forth below:

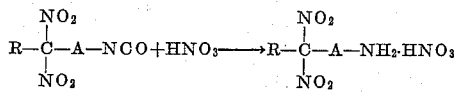

wherein R and A are as defined above.

The reaction is preferably conducted at a temperature in the range of from about 40 to 120° C., however, both higher and lower temperatures can be used if desired.

The isocyanates used as starting materials in this invention are prepared by reacting their corresponding acyl halides with sodium azide and allowing the subsequent rearrangement to take place under anhydrous conditions, as disclosed in assignee's copending application Serial No. 405,515, filed January 21, 1954, now U.S. Patent No. 2,923,726.

To more clearly illustrate this invention, the following examples are presented. It is to be understood, however, that these examples are presented merely as a means of illustration and are not intended to limit the scope of the invention in any way.

EXAMPLE I

*Preparation of the nitrate salt of 3,3-dinitrobutylamine*

In a round-bottom flask fitted with a reflux condenser, 3,3-dinitrobutyl isocyanate was heated with a ten fold excess of 35% nitric acid on a steam bath for a period of 3 hours. The solution was evaporated to dryness in vacuo leaving a quantitative yield of nitrate salt of 3,3-dinitrobutylamine. Upon recrystallization from ethyl acetate and ether, the product exhibited a M.P. of 130–133° C. The elemental analysis of the product is as follows:

Calculated for $C_4H_{10}N_4O_7$: percent C, 21.24; percent H, 4.46; percent N, 24.78. Found: percent C, 21.39; percent H, 4.63; percent N, 25.19.

The explosive power of this compound is:
Lead block value 112 TNT=100.
Ballistic mortar value 116 TNT=100.

EXAMPLE II

*Preparation of the nitrate salt of 3,3,3-trinitropropylamine*

The nitrate salt of 3,3,3-trinitropropyl amine was prepared by following the procedure described in Example I and recrystallizing the product from methanol. The product exhibited a M.P. of 131–133° C. The elemental analysis of the product is as follows:

Calculated for $C_3H_7N_5O_9$: percent C, 14.01; percent H, 2.74; percent N, 27.24. Found: percent C, 14.09; percent H, 2.80; percent N, 26.58.

The explosive power of this compound is:
Lead block value 171 TNT=100.
Ballistic mortar value 144 TNT=100.

I have also found that nitro-containing isocyanates such as 3,3-dinitrohexyl isocyanate, 4,4,4-trinitrobutyl isocyanate, 4,4-dinitropentyl isocyanate, readily undergo this reaction with dilute nitric acid to form nitrate salts of the corresponding amines, namely, 3,3-dinitrohexyl amine, 4,4,4-trinitrobutyl amine, and 4,4-dinitropentyl amine.

It is apparent that the nitrate salt of any nitro-containing amine of this type can be prepared by merely reacting an appropriate isocyanate with dilute nitric acid, in accordance with the examples set forth above.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, the nitrate salts of aliphatic polynitro amines having the general formula:

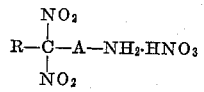

wherein R is a radical selected from the group consisting of lower alkyl and nitro radicals and A is a lower alkylene radical.

2. As a composition of matter, 3,3,3-trinitropropyl-amine nitrate salt having the structural formula:

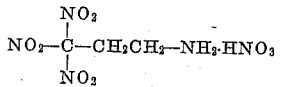

3. As a composition of matter, 3,3-dinitrobutyl amine nitrate salt having the structural formula:

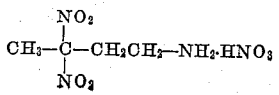

4. As a composition of matter, 3,3-dinitrohexyl amine nitrate salt having the structural formula:

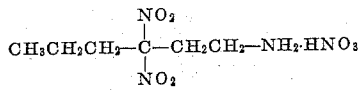

5. As a composition of matter, 4,4,4-trinitrobutyl amine nitrate salt having the structural formula:

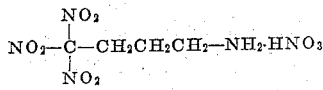

6. As a composition of matter, 4,4-dinitropentyl amine nitrate salt having the structural formula:

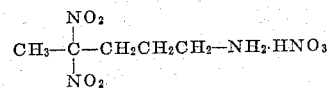

7. The method of preparing nitrate salts of aliphatic polynitro amines having the general formula:

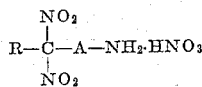

which comprises reacting an isocyanate having the general formula:

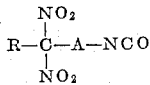

wherein A is a lower alkylene radical and R is a radical selected from a group consisting of nitro and lower alkyl groups, with dilute nitric acid.

8. The method of preparing 3,3,3-trinitropropyl amine nitrate salt which comprises reacting 3,3,3-trinitropropyl isocyanate with dilute nitric acid.

9. The method of preparing 3,3-dinitrobutyl amine nitrate salt which comprises reacting 3,3-dinitrobutyl isocyanate with dilute nitric acid.

10. The method of preparing 3,3-dinitrohexyl amine nitrate salt which comprises reacting 3,3-dinitrohexyl isocyanate with dilute nitric acid.

11. The method of preparing 4,4,4-trinitrobutyl amine nitrate salt which comprises reacting 4,4,4-trinitrobutyl isocyanate with dilute nitric acid.

12. The method of preparing 4,4-dinitropentyl amine nitrate salt which comprises reacting 4,4-dinitropentyl isocyanate with dilute nitric acid.

13. The method of claim 7 wherein the reaction is conducted at reflux temperature.

14. The method of claim 7 wherein the reaction is conducted at a temperature of from about 40° to about 120° C.

References Cited in the file of this patent
UNITED STATES PATENTS 2,731,460    Schenck et al. _____ Jan. 17, 1956

OTHER REFERENCES

Textbook of Organic Chemistry, Wertheim, 2nd ed., 1946, The Blakiston Co., Philadelphia, pp. 308 and 306.
Gilman: Organic Chemistry, 2nd ed. (1948), John Wiley & Sons, Inc., New York, vol. 1, p. 665.